(12) United States Patent
Chen et al.

(10) Patent No.: US 7,715,183 B2
(45) Date of Patent: May 11, 2010

(54) AIR DAMPING SHOCKPROOF STRUCTURE

(75) Inventors: Han-Ting Chen, Hsin Chu Shien (TW); Yu-Hsiang Fang, Changhua County (TW)

(73) Assignee: Quanta Computer Inc., Tao Yuan Shien (TW)

( * ) Notice: Subject to any disclaimer, the term of this patent is extended or adjusted under 35 U.S.C. 154(b) by 119 days.

(21) Appl. No.: 12/216,963

(22) Filed: Jul. 14, 2008

(65) Prior Publication Data

US 2009/0136715 A1    May 28, 2009

(30) Foreign Application Priority Data

Nov. 22, 2007   (TW)   ............................. 96144352 A

(51) Int. Cl.
*G06F 1/16* (2006.01)

(52) U.S. Cl. ............... 361/679.33; 428/156; 360/97.01; 347/92

(58) Field of Classification Search ................. 428/156, 428/34.1; 62/340, 344; 415/116, 119, 140; 347/20, 87, 92; 454/184; 324/76.11; 360/97.02, 360/235.4, 99.12, 97.01; 361/679.33, 679.34, 361/679.35, 679.36, 679.37, 679.38
See application file for complete search history.

(56) References Cited

U.S. PATENT DOCUMENTS

| 2008/0160899 A1* | 7/2008 | Henry et al. ................. 454/184 |
| 2009/0201008 A1* | 8/2009 | Chou et al. ............... 324/76.11 |
| 2009/0262455 A1* | 10/2009 | Merrow ................... 360/97.02 |

* cited by examiner

*Primary Examiner*—Hung V Duong
(74) *Attorney, Agent, or Firm*—Rabin & Berdo, PC

(57) ABSTRACT

An air damping shockproof structure disposed between a hard disk and a system for damping or buffering a shocking or a vibration to the hard disk in the system. The air damping shockproof structure includes a top portion, a side portion, and a bottom portion, and an air chamber array disposed in the top portion. The air chamber array includes a plurality of air chambers, and a plurality of air outlets disposed corresponding to each air chamber respectively. The cross-sectional area of each air outlet is smaller than a cross-sectional area of each air chamber.

20 Claims, 8 Drawing Sheets

AIR DAMPING SHOCKPROOF STRUCTURE

RELATED APPLICATIONS

This application claims priority to Taiwan Application Serial Number 96144352 filed Nov. 22, 2007, which is herein incorporated by reference.

BACKGROUND

1. Field of Invention

The present invention relates to a shockproof structure. More particularly, the present invention relates to a shockproof structure for a hard disk device.

2. Description of Related Art

Due to an enormous increase of computer processing speed, the computer can handle a significant amount of data and information. Data and information are usually stored on hard disks. Normally, in a computer system, the hard disk is the main storage medium for storing programs, files, and various data and information. Therefore, the shockproof structure to prevent the hard disks from shock damage is really important in the computer system.

Refer to FIG. 1. FIG. 1 illustrates an oblique diagram of a hard disk with a conventional hard disk shockproof structure. The shockproof structure 120 may be disposed between the hard disk 100 and a hard disk bracket (not shown). The material of the shockproof structure 120 may be a shock absorbing material, such as a rubber. The elasticity of the shock absorbing material may absorb the shock from unexpected collisions. The shockproof structure 120 may include a plurality of ribs 122 disposed on the surface according to the direction of the force. A plane 124 is disposed between two adjacent ribs 122.

The planes 124 disposed between the ribs 124 of the conventional shockproof structure 120 may be bent and separated from the hard disk 100 when the system is shocked, which leads to reduce the shockproof efficiency of the conventional shockproof structure 120.

SUMMARY

It is to be understood that both the foregoing general description and the following detailed description are by examples, and are intended to provide further explanation of the invention as claimed.

The invention provides an air damping shockproof structure disposed between a hard disk and a system for damping or buffering a shocking or vibration to the hard disk in the system. The air damping shockproof structure includes a top portion, a side portion, and a bottom portion, and an air chamber array disposed in the top portion. The air chamber array includes at least one air chamber, and at least one air outlet disposed corresponding to the air chamber. The cross-sectional area of the air outlet is smaller than the cross-sectional area of the air chamber. An air in the air chambers flows to the air outlet to generate an air resistance when the air damping shockproof structure is shocked.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
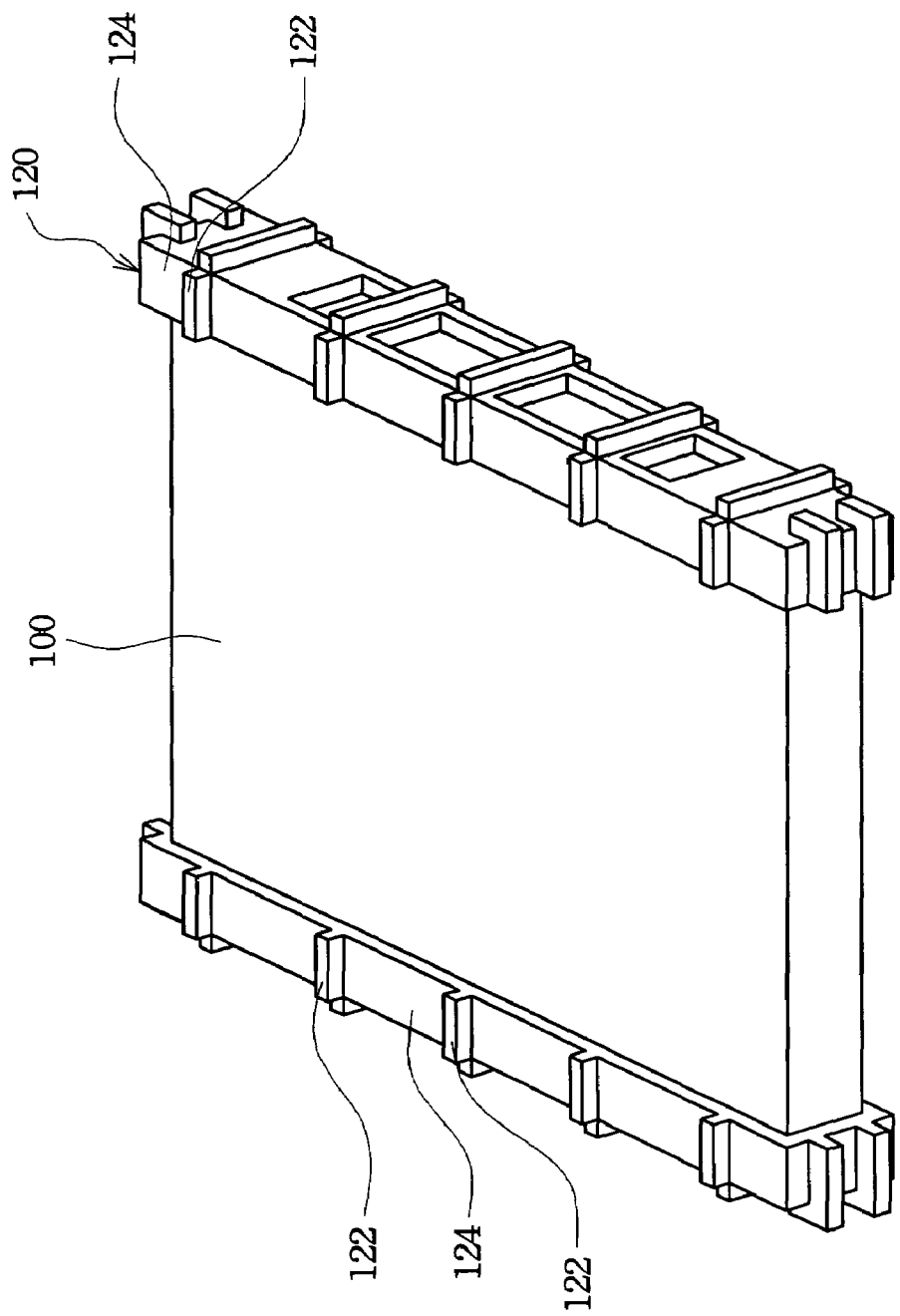
FIG. 1 is an oblique diagram of an embodiment of a conventional shockproof structure.

Reference will now be made in detail to the present preferred, embodiments of the invention, examples of which are illustrated in the accompanying drawings. Wherever possible, the same reference numbers are used in the drawings and the description to refer to the same or like parts.

Figure 2:
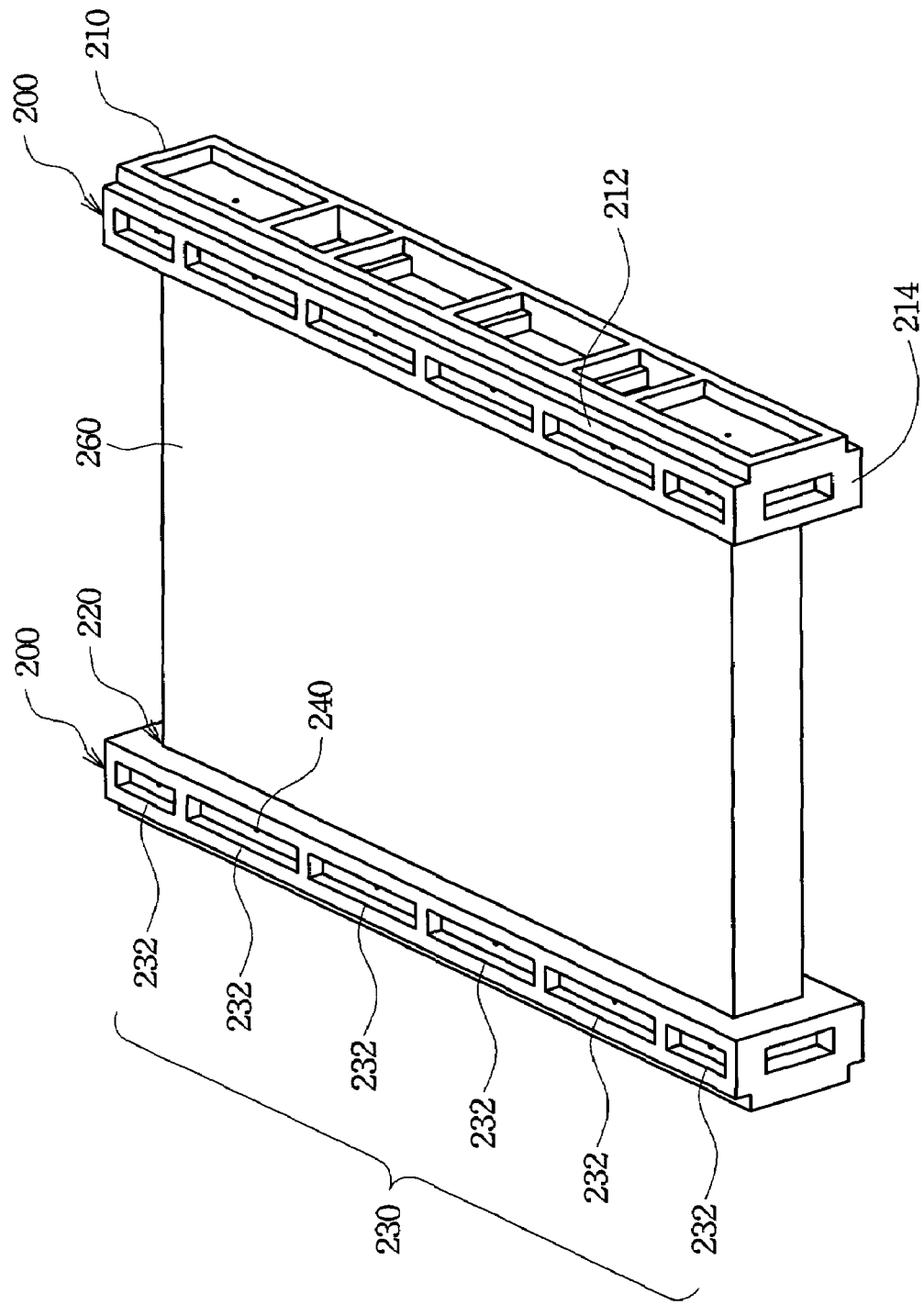
FIG. 2 is an oblique diagram of an embodiment of the air damping shockproof structure of the invention.

Refer to FIG. 2. FIG. 2 illustrates an oblique diagram of an embodiment of the air damping shockproof structure 200 of the invention. The air damping shockproof structure 200 includes a top portion 212, a bottom portion 214, a side portion 210, and a cavity 220. The cavity 220 is formed in a U-shaped or ⊓-shaped structure defined by the top portion 212, the side portion 210, and the side portion 216. A hard disk 260 may be placed in the cavity 220 of the air damping shockproof structure 200.

The air damping shockproof structure 200 further includes a plurality of air chamber arrays 230. The air chamber arrays 230 may be disposed in the top portion 212, the side portion 210, and the bottom portion 214 respectively. Each air chamber array 230 may include a plurality of air chambers 232. The air damping shockproof structure 200 may include a plurality of air outlets 240 disposed in the air chamber arrays 230 and correspond to the air chamber 232 respectively. The air outlets 240 may pass through the air chambers to the hard disk 260. The cross-sectional area of each air outlet 240 is smaller than that of each air chamber 232.

Figure 3:
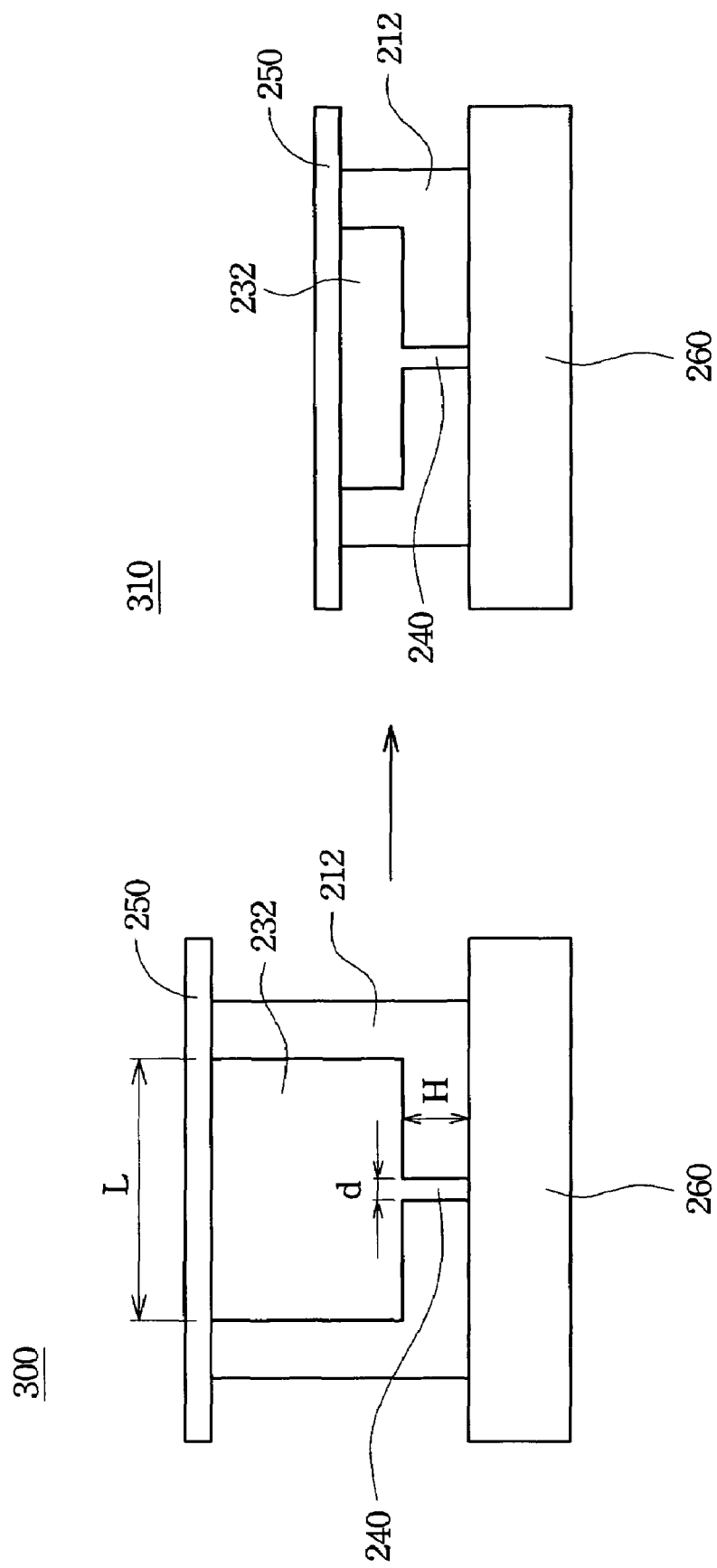
FIG. 3 is an operating schematic diagram of the embodiment of the top portion of the air damping shockproof structure of the invention.

Refer to FIG. 3. FIG. 3 illustrates an operating schematic diagram of the embodiment of the top portion of the air damping shockproof structure 200 of the invention. In order to better describe the embodiment, FIG. 3 is not illustrated according to the real scale of the air damping shockproof structure 200. The air outlet 240 has a width d, and the air chamber 232 has a width L. The width ratio of the air outlet 240 and the air chamber 232 is about 1/10 to 1/5 (i.e. d/L=1/10 to 1/5). The width d of the air outlet 240 is equal to or approximate to a height H of the air outlet 240. It have to be noted that the air chamber array 230 may also be designed to have only one air chamber 232 and only one air outlet 240. The number and the arrangement of the air chambers 232 and the air outlets 240 may be designed according to the requirement of different product. In other words, each air chamber array 230 may include at least one air chamber 232 and a corresponding air outlet 240.

State 300 illustrates a non-shocked state of this embodiment. The system 250 may be a hard disk bracket, which touches the top portion 212, the side portion, and the bottom portion (not shown). The system 250 may include a metal piece or a plastic piece. State 310 illustrates a shocked state of this embodiment. During the state 310, the air damping shockproof structure 200 is pushed by a force from the system 250 when the system 250 is shocked, and the air in the air chamber 232 would be pushed and flow to the air outlet 240 to balance the pressure in the air chamber 232 at the same time.

However, the cross-sectional area of the air outlet 240 is smaller than that of the air chamber 232, thus, the airflow to the air outlet 240 would be compressed into a narrowed airflow, which generates air resistance. The air damping shockproof structure 200 may use the air resistance to buffer or damp the shock or vibration from the system 250 to prevent the hard disk 260 from damaging.

Figure 4A:
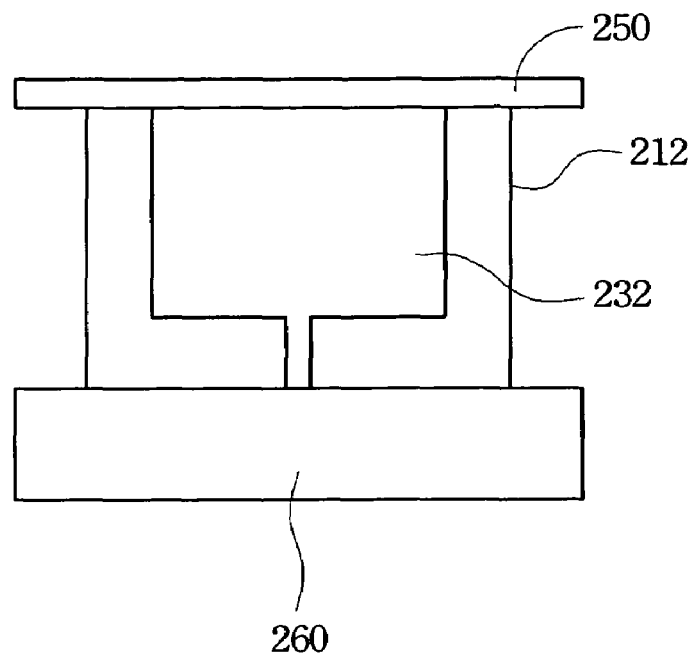
FIG. 4A to FIG. 4C are side view diagrams of different embodiments of the air chamber of the air damping shockproof structure of the invention.
Figure 4B:
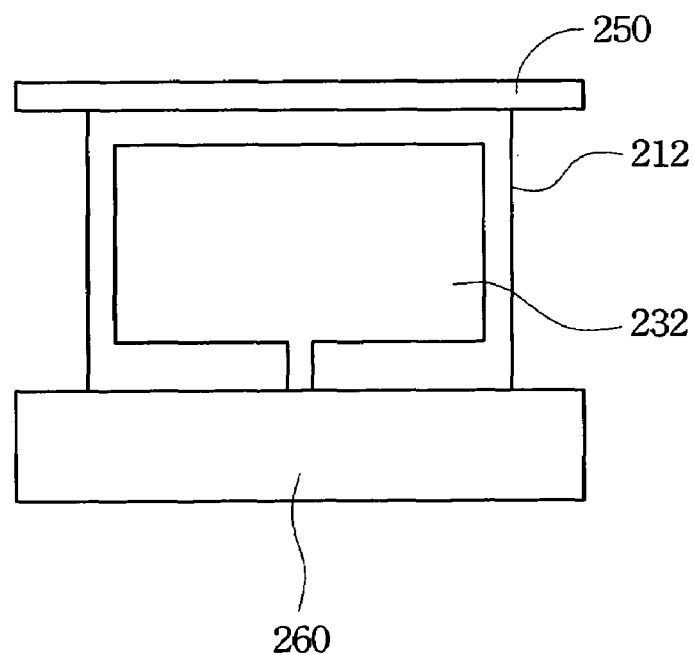
Figure 4C:
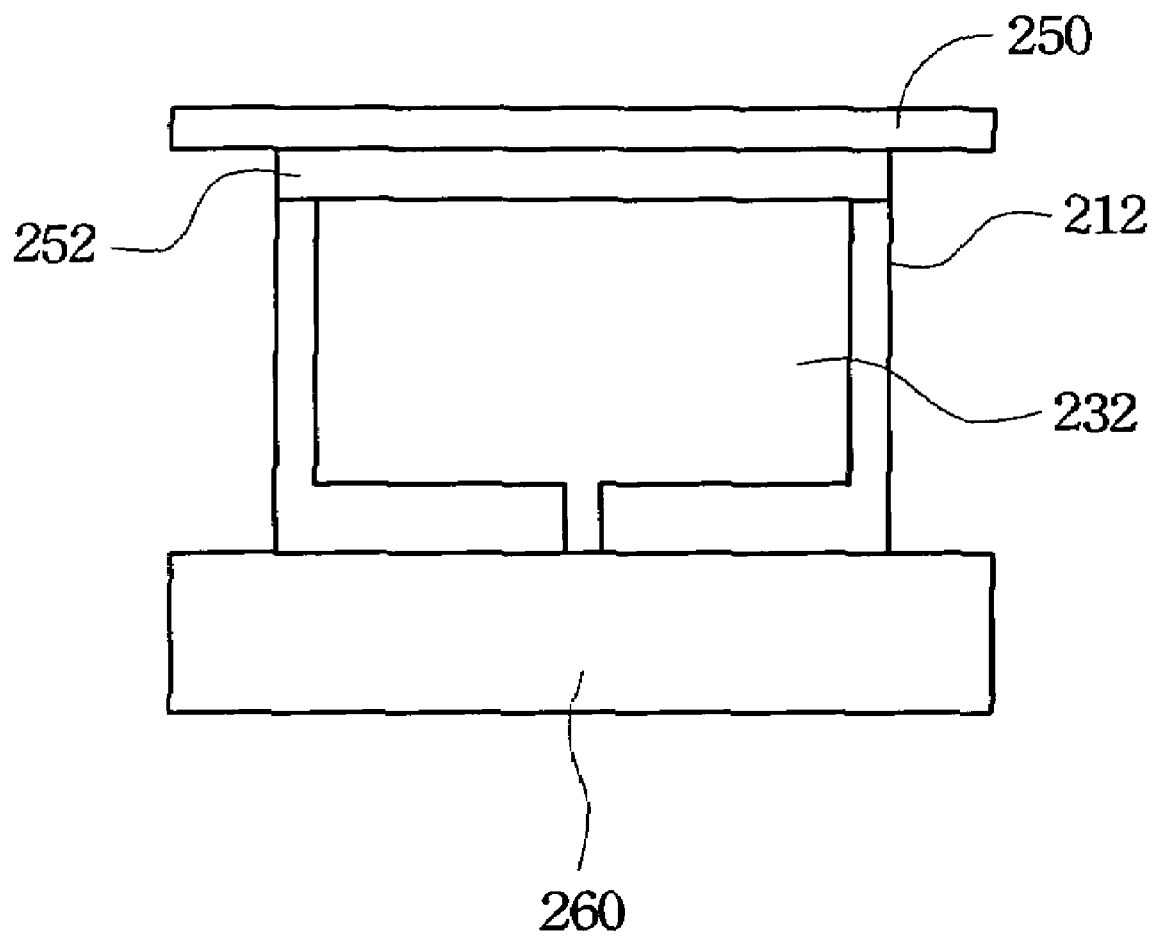

Refer to FIG. 4A to FIG. 4C. FIG. 4A and FIG. 4C illustrate side view diagrams of the different embodiment of the air chamber 232 of the air damping shockproof structure 200 of the invention. The material of the air damping shockproof structure 200 may be elastic such as rubber or other likes. In FIG. 4A, the side of the top portion 212 touching the system 250 is an opening side, and the air chamber 232 disposed in the top portion 212 may be sealed by the system 250 directly. In FIG. 4B, the side of the top portion touching the system 250 may be a closed side, in other words, the air chamber 232 may be formed in the top portion 212 directly instead of touching the system 250 directly.

In FIG. 4C, the side of the top portion 212 opposite to the hard disk 260 may be the opening side. The difference between FIG. 4A and FIG. 4C is that a block 252 is disposed corresponding to the opening side to seal the air chamber 232 ffixing the air damping shockproof structure 200 between the system 250 and the hard disk 260. The air damping shockproof structure 200 may damp or buffer the vibration of the hard disk 260 when the system 250 is shocked.

Figure 5A:
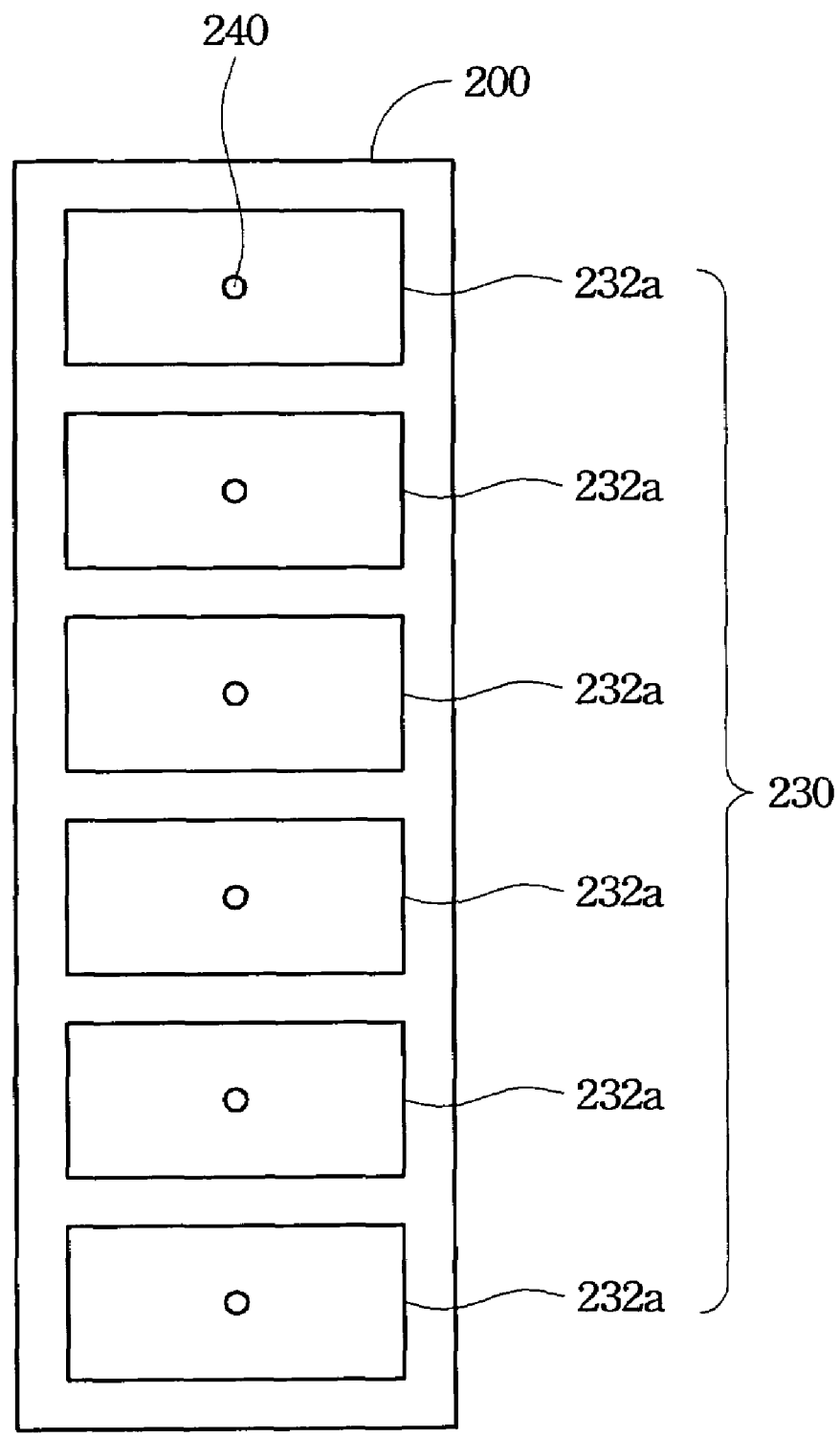
FIG. 5A to FIG. 5C are schematic diagrams of different embodiments of the air chamber array of the air damping shockproof structure of the invention.
Figure 5B:
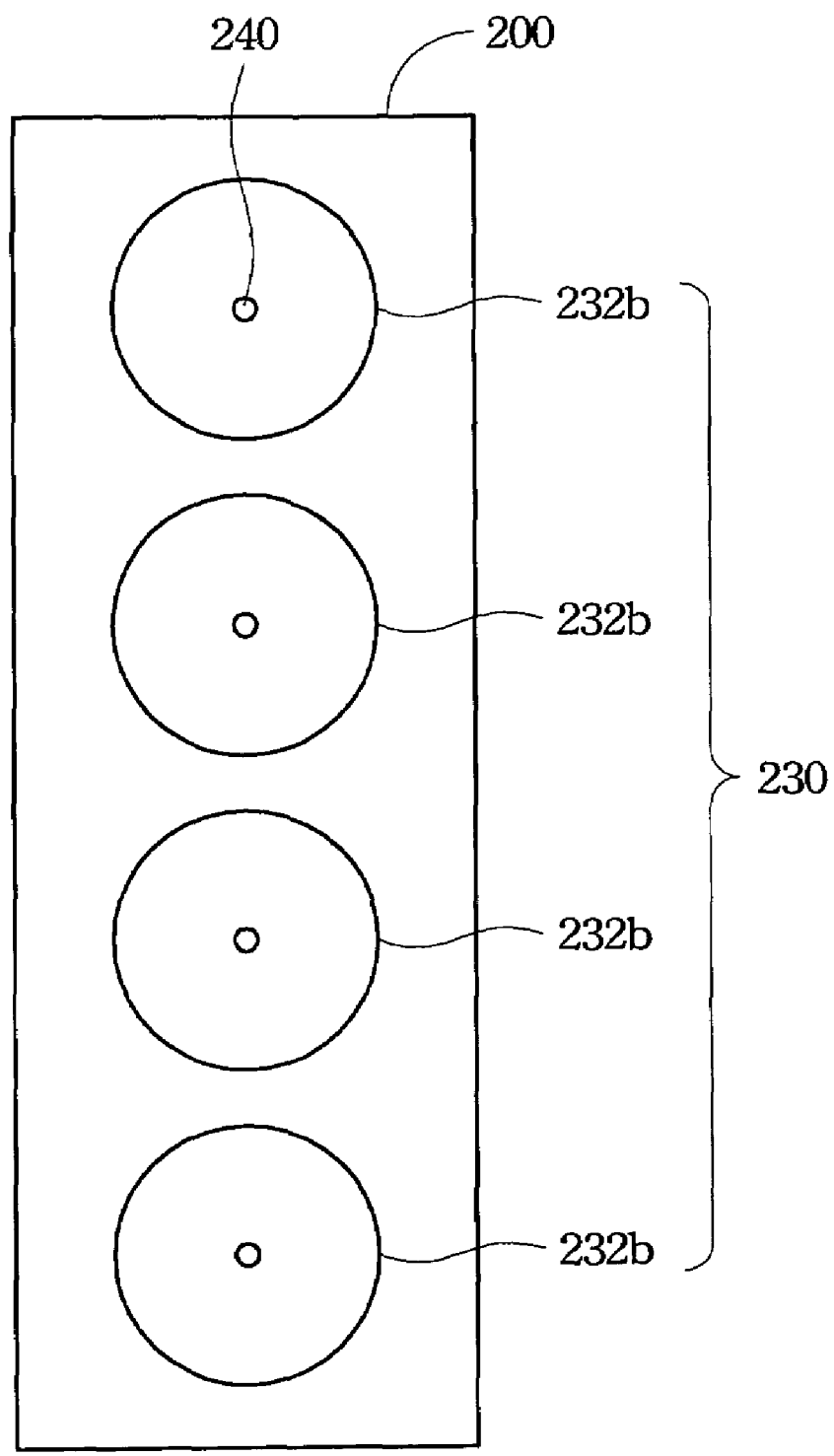
Figure 5C:
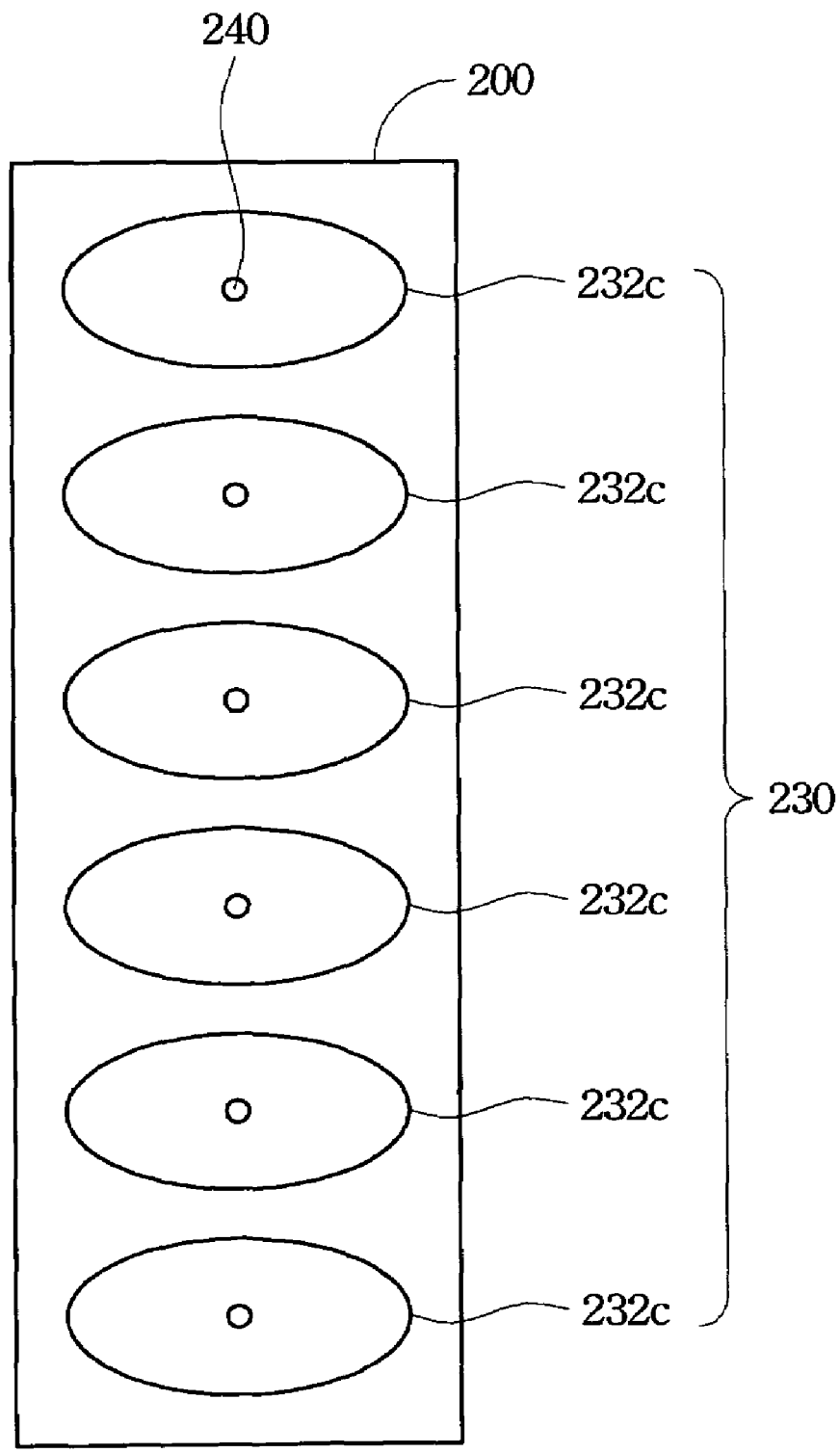

Refer to FIG. 5A to FIG. 5C. FIG. 5A to FIG. 5C illustrate schematic diagrams of different embodiments of the air chamber array 230 of the air damping shockproof structure 200 of the invention. The air outlets 240 are arranged in the air chambers 232 respectively in the air chamber arrays 230. The cross-sectional area of the air outlet 240 is smaller than that of the air chamber 232. The cross-sectional shape of the air chambers 232 may be a rectangle, circle, triangle, polygon, or a combination thereof. For example, the cross-sectional shape of the air chambers 232a in FIG. 5A is a rectangle; the cross-sectional shape of the air chambers 232b in FIG. 5B may be a circle; the cross-sectional shape of the air chambers 232c in FIG. 5C may be an ellipse.

The variation of above air chamber 232 is not limited to the top portion 212, the various shapes and structure of air chambers 232 may also be utilized in the side portion 210 and the bottom portion 214 (shown in FIG. 2) of the air damping shockproof structure 200.

When the system is shocked, the air in the air chamber may be pushed and flow to the air outlet with smaller cross-sectional area then the air resistance is generated to buffer the vibration of the hard disk in the system, which reduces the shock amplification significantly and shorten the equilibrium time of the system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An air damping shockproof structure disposed between a hard disk and a system, the air damping shockproof structure comprising:
   a top portion;
   a bottom portion;
   a side portion, wherein the top portion, the bottom portion, and the side portion are arranged as a U-shaped structure;
   a cavity formed in the U-shaped structure for containing the hard disk;
   an air chamber array disposed in the top portion comprising at least one air chamber; and
   at least one air outlet disposed corresponding to the air chamber and passing through the air chamber to touch the hard disk, wherein a cross-sectional area of the air outlet is smaller than a cross-sectional area of the air chamber,
   whereby an air in the air chamber flows to the air outlet to generate an air resistance when the air damping shockproof structure is shocked.

2. The air damping shockproof structure of claim 1, wherein the system is a hard disk bracket.

3. The air damping shockproof structure of claim 2, wherein a side of the top portion touching the system is an open side, and the air chamber is sealed by the system.

4. The air damping shockproof structure of claim 3, wherein the system comprises a metal piece or a plastic piece.

5. The air damping shockproof structure of claim 2, wherein a side of the top portion opposite to the hard disk is an open side; and a block is disposed corresponding to the open side to seal the air chamber.

6. The air damping shockproof structure of claim 2, wherein a side of the top portion touching the system is a closed side, and the air chamber is formed in the top portion.

7. The air damping shockproof structure of claim 1, wherein a cross-sectional shape of the air chamber is selected from a group consisting of rectangle, circle, ellipse, triangle, polygon, and the combination thereof.

8. The air damping shockproof structure of claim 1, further comprising an air chamber array disposed on the side portion.

9. The air damping shockproof structure of claim 8, further comprising an air chamber array disposed on the bottom portion.

10. The air damping shockproof structure of claim 1, wherein a width ratio of the air outlet and the air chamber is between 1/10 to 1/5, and a width of the air outlet is approximate or equal to a height of the air outlet.

11. An air damping shockproof structure disposed between a hard disk and a system, the air damping shockproof structure comprising:
    a top portion;
    a bottom portion;
    a cavity disposed between the top portion and the bottom portion for placing the hard disk;
    an air chamber array disposed in the top portion comprising at least one air chamber; and
    at least one air outlet disposed corresponding to the air chamber and passing through the air chamber to touch the hard disk, wherein a cross-sectional area of the air outlet is smaller than a cross-sectional area of the air chamber,
    whereby an air in the air chamber flows to the air outlet to generate an air resistance when the air damping shockproof structure is shocked.

12. The air damping shockproof structure of claim 11, wherein the system is a hard disk bracket.

13. The air damping shockproof structure of claim 12, wherein a side of the top portion touching the system is an open side, and the air chamber is sealed by the system.

14. The air damping shockproof structure of claim 13, wherein the system comprises a metal piece or a plastic piece.

15. The air damping shockproof structure of claim 12, wherein a side of the top portion opposite to the hard disk is an open side; and a block is disposed corresponding to the open side to seal the air chamber.

16. The air damping shockproof structure of claim 12, wherein a side of the top portion touching the system is a closed side, and the air chamber is formed in the top portion.

17. The air damping shockproof structure of claim 11, wherein the cross-sectional shape of the air chamber is selected from a group consisting of rectangle, circle, ellipse, triangle, polygon, and the combination thereof.

18. The air damping shockproof structure of claim 11, further comprising an air chamber array disposed on the bottom portion.

19. The air damping shockproof structure of claim 11, wherein a width ratio of the air outlet and the air chamber is between 1/10 to 1/5, and a width of the air outlet is approximate or equal to a height of the air outlet.

20. An air damping shockproof structure, comprising:
   a top portion;
   an air chamber array disposed in the top portion comprising at least one air chamber; and
   at least one air outlet disposed corresponding to the air chamber and passing through the air chamber, wherein a cross-sectional area of the air outlet is smaller than a cross-sectional area of the air chamber,
   whereby an air resistance is generated when an air in the air chamber flows to the air outlet.

* * * * *